(12) United States Patent
Lee et al.

(10) Patent No.: US 9,078,486 B2
(45) Date of Patent: *Jul. 14, 2015

(54) MULTI-LAYER DECORATIVE VAMP AND METHOD OF ITS MANUFACTURE

(75) Inventors: Chi-Shih Lee, Taichung (TW); Chun-Hsien Lee, Taichung (TW)

(73) Assignee: Jah Yih Enterprises Co., Ltd., Taichung (TW)

( * ) Notice: Subject to any disclaimer, the term of this patent is extended or adjusted under 35 U.S.C. 154(b) by 743 days.

This patent is subject to a terminal disclaimer.

(21) Appl. No.: 13/350,888

(22) Filed: Jan. 16, 2012

(65) Prior Publication Data

US 2012/0186102 A1   Jul. 26, 2012

(30) Foreign Application Priority Data

Jan. 20, 2011  (TW) .............................. 100102158 A (51) Int. Cl.
| B29C 65/48 | (2006.01) |
| B32B 37/12 | (2006.01) |
| B32B 37/26 | (2006.01) |
| B32B 38/10 | (2006.01) |
| B32B 43/00 | (2006.01) |
| C09J 5/10 | (2006.01) |
| C08J 5/12 | (2006.01) |
| A43B 1/00 | (2006.01) |
| A43B 23/02 | (2006.01) |
| B29D 35/14 | (2010.01) |
| B44C 3/02 | (2006.01) |

(52) U.S. Cl.
CPC ............ *A43B 1/0027* (2013.01); *A43B 23/0235* (2013.01); *A43B 23/0255* (2013.01); *B29D 35/146* (2013.01); *B44C 3/02* (2013.01)

(58) Field of Classification Search
CPC ............ A43B 1/0027; A43B 23/0235; A43B 23/0255; B29D 35/146; B44C 3/02; B29C 51/14; B29C 65/02; B29C 65/18; B29C 66/004; B32B 7/06; B32B 27/40; B32B 37/26; B32B 38/0036
USPC ........... 428/170; 156/60, 79, 247, 289, 306.6, 156/308.2, 309.6; 36/45
See application file for complete search history.

(56) References Cited

U.S. PATENT DOCUMENTS

| 3,568,339 | A | * | 3/1971 | Hara et al. | ........................ 36/87 |
| 4,347,673 | A | * | 9/1982 | Svetlik | .......................... 36/32 R |
| 4,899,411 | A | * | 2/1990 | Johnson et al. | ............. 12/142 R |
| 6,025,064 | A | * | 2/2000 | Kawata et al. | ............. 428/304.4 |
| 6,765,123 | B2 | * | 7/2004 | de Jong et al. | .................. 602/56 |

(Continued)

FOREIGN PATENT DOCUMENTS

| CN | 1625992 A | 6/2005 |
| CN | 2801468 Y | 8/2006 |

(Continued)

*Primary Examiner* — Sing P Chan
(74) *Attorney, Agent, or Firm* — Alan D. Kamrath; Kamrath IP Lawfirm, P.A.

(57) ABSTRACT

A method for producing the multi-layer decorative vamp according to the first embodiment includes the steps of (a) providing a base, a first plate, and a second plate, which have been cut to a predetermined shape respectively; (b) arranging the base and the first and second plates in a predetermined order; (c) stacking the first and second plates and the base, with the first plate disposed between the base and the second plate to form a stacked array; and (d) hot pressing the stacked array.

9 Claims, 13 Drawing Sheets

(56) References Cited

U.S. PATENT DOCUMENTS

| | | | |
|---|---|---|---|
| 6,769,204 B1* | 8/2004 | Phillips | 36/136 |
| 6,790,526 B2* | 9/2004 | Vargo et al. | 428/343 |
| 6,802,140 B2* | 10/2004 | Aslanides | 36/136 |
| 6,977,023 B2* | 12/2005 | Abrams | 156/230 |
| 7,521,385 B2* | 4/2009 | Ahluwalia | 442/79 |
| 7,611,767 B2* | 11/2009 | Usui et al. | 428/208 |
| 7,625,625 B2* | 12/2009 | Rios et al. | 428/141 |
| 7,827,704 B2* | 11/2010 | Fox et al. | 36/44 |
| 8,012,293 B2* | 9/2011 | Lee | 156/249 |
| 8,091,963 B2* | 1/2012 | Wyner et al. | 297/214 |
| 8,496,777 B2* | 7/2013 | Lee et al. | 156/247 |
| 8,894,788 B2* | 11/2014 | Lee | 156/179 |
| 2002/0078599 A1* | 6/2002 | Delgorgue et al. | 36/98 |
| 2002/0122926 A1* | 9/2002 | Goodson | 428/220 |
| 2003/0072889 A1* | 4/2003 | Abrams | 427/458 |
| 2003/0152766 A1* | 8/2003 | Vargo et al. | 428/343 |
| 2003/0176125 A1* | 9/2003 | Ahluwalia | 442/59 |
| 2003/0176130 A1* | 9/2003 | Lee | 442/239 |
| 2003/0224679 A1* | 12/2003 | Ahluwalia | 442/72 |
| 2004/0042965 A1* | 3/2004 | Usui et al. | 424/40 |
| 2004/0087230 A1* | 5/2004 | Wildeman | 442/172 |
| 2004/0149732 A1* | 8/2004 | Usui et al. | 219/528 |
| 2004/0172855 A1* | 9/2004 | Aslanides | 36/136 |
| 2005/0079339 A1* | 4/2005 | Riddle | 428/313.7 |
| 2005/0100717 A1* | 5/2005 | Riddle | 428/195.1 |
| 2005/0161144 A1* | 7/2005 | Nakajima et al. | 156/73.1 |
| 2007/0148409 A1* | 6/2007 | Rios et al. | 428/167 |
| 2009/0022957 A1* | 1/2009 | Aso et al. | 428/160 |
| 2009/0162596 A1* | 6/2009 | Rios et al. | 428/45 |
| 2010/0080966 A1* | 4/2010 | Lee | 428/203 |
| 2010/0080968 A1* | 4/2010 | Mizuno et al. | 428/205 |
| 2012/0186102 A1* | 7/2012 | Lee et al. | 36/45 |
| 2012/0189852 A1* | 7/2012 | Lee et al. | 428/411.1 |
| 2012/0267043 A1* | 10/2012 | Lee | 156/247 |
| 2012/0297642 A1* | 11/2012 | Schaefer et al. | 36/45 |
| 2012/0297643 A1* | 11/2012 | Shaffer et al. | 36/83 |

FOREIGN PATENT DOCUMENTS

| | | |
|---|---|---|
| CN | 1927574 A | 3/2007 |
| TW | 210319 B | 8/1993 |
| TW | 339264 | 9/1998 |
| TW | 480932 U | 3/2002 |

* cited by examiner

Providing a base, a first plate, and a second plate, which have been cut to a predetermined shape respectively.

Arranging the base and the first and second plates in a predetermined order.

Stacking the first and second plates and the base, and the first plate disposed between the base and the second plate to form a stacked array.

Hot pressing the stacked array.

MULTI-LAYER DECORATIVE VAMP AND METHOD OF ITS MANUFACTURE

BACKGROUND OF THE INVENTION

1. Field of the Invention

The present invention relates generally to a multi-layer decorative vamp and, more particularly, to a multi-layer decorative vamp produced by hot pressing.

2. Description of the Related Art

A shoe is an item of footwear intended to protect and comfort the human foot while doing various activities. Shoes are also used as an item of decoration. Various universal shoes, in which, the shoes each comprises a sole, an insole, an outsole, a midsole disposed between the outsole and the insole, a heel disposed a rear thereof, and a vamp disposed upper thereof to hold the shoe onto the foot. Additionally, closed footwear, such as boots, trainers and most men's shoes, will have a more complex vamp. Hence, the design of shoes often has ornaments sewn on the vamp to make a certain style to look attractive. Presently, the ornament sewn on the vamp requires a large amount of manual labor for sewing work. In addition, the ornament must reserve the outlet seam to provide a space to be sewn on the vamp, so that a small size or complex ornament is hard and inconvenient to be sewn on the vamp and increases manufacturing costs.

The present invention is, therefore, intended to obviate or at least alleviate the problems encountered in the prior art.

SUMMARY OF THE INVENTION

According to the present invention, the main purpose is to provide a method for producing a multi-layer decorating vamp which includes the steps of: (a) providing a base, a first plate, and a second plate, which have been cut to a predetermined shape respectively; (b) arranging the base and the first and second plates in a predetermined order; (c) stacking the first and second plates and the base, with the first plate disposed between the base and the second plate to form a stacked array; and (d) hot pressing the stacked array.

An advantage of the method for producing the multi-layer decorating vamp according to the present invention is that the base and the first and second plates are connected with each other by hot pressing rather than sewing, thereby allowing the multilayer decorating vamp to be processed accurately, conveniently and in a cost-saving manner.

Another advantage of the method for producing the multi-layer decorating vamp according to the present invention is that the first and second plates can be small objects and do not require the outlet seams.

Other objects, advantages, and new features of the present invention will become apparent from the following detailed description of the invention when considered in conjunction with the accompanied drawings.

BRIEF DESCRIPTION OF THE DRAWINGS

The illustrative embodiments may best be described by reference to the accompanying drawings where.

All Figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various Figures of the drawings, the same numerals designate the same or similar parts. Furthermore, when the terms "first", "second", "third", "inner", "outer", "side", "end", "portion", "section", "longitudinal", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

The present invention will be described through detailed illustration of five embodiments referring to the drawings.

Figure 1:
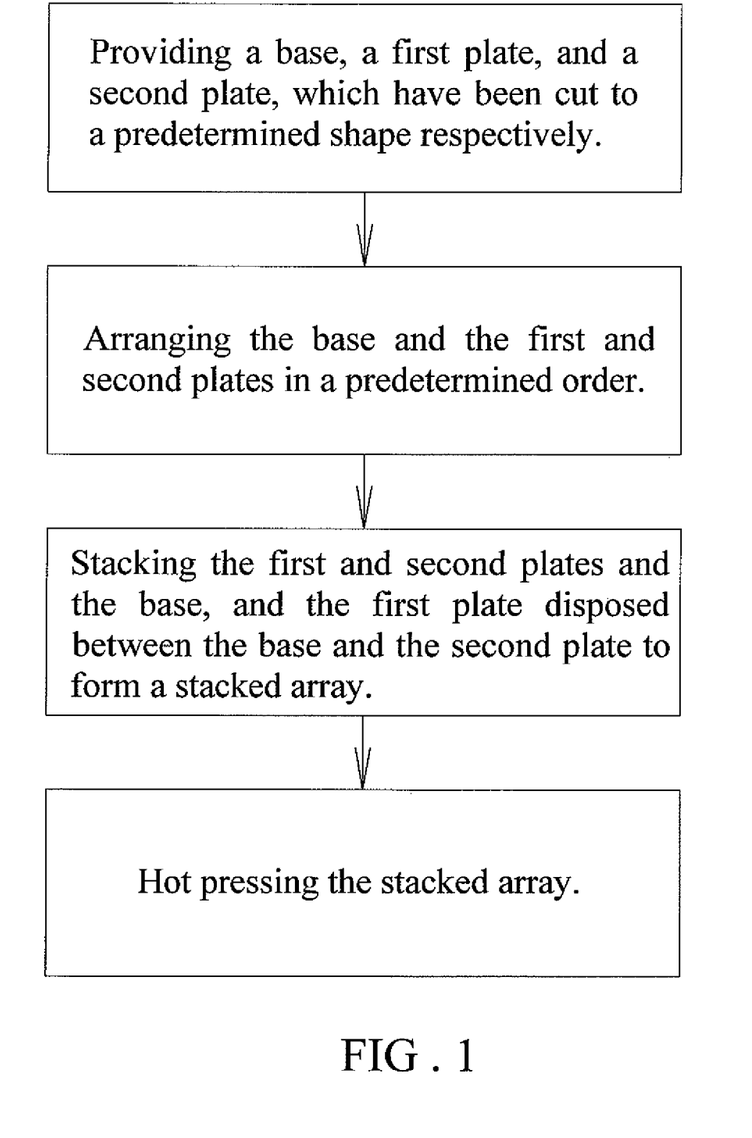
FIG. 1 is a flow chart of a method for producing a multi-layer decorating vamp, in accordance with the present invention.

Referring to FIG. 1, a method for producing the multi-layer decorative vamp according to the first embodiment includes the steps of: (a) providing a base, a first plate, and a second plate, which have been cut to a predetermined shape respectively; (b) arranging the base and the first and second plates in a predetermined order; (c) stacking the first and second plates and the base, with the first plate disposed between the base and the second plate to form a stacked array; and (d) hot pressing the stacked array.

Referring to FIGS. 2 through 5, there is shown a multi-layer decorative vamp according to a first embodiment of the present invention. The multi-layer decorative vamp is adapted for coupling with an upper of the shoe.

Figure 2:
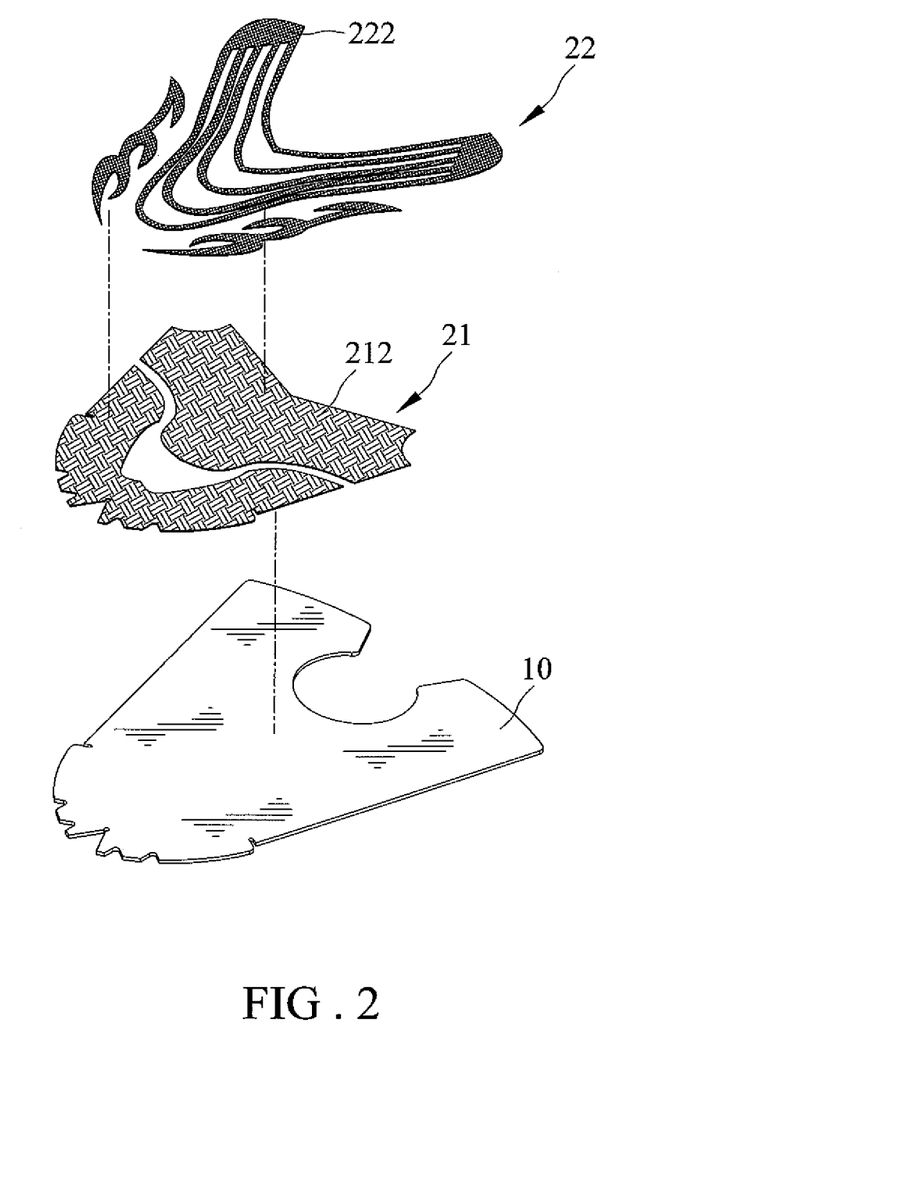
FIG. 2 is an exploded perspective view of the multi-layer decorating vamp in accordance with a first embodiment of the present invention.
Figure 3:
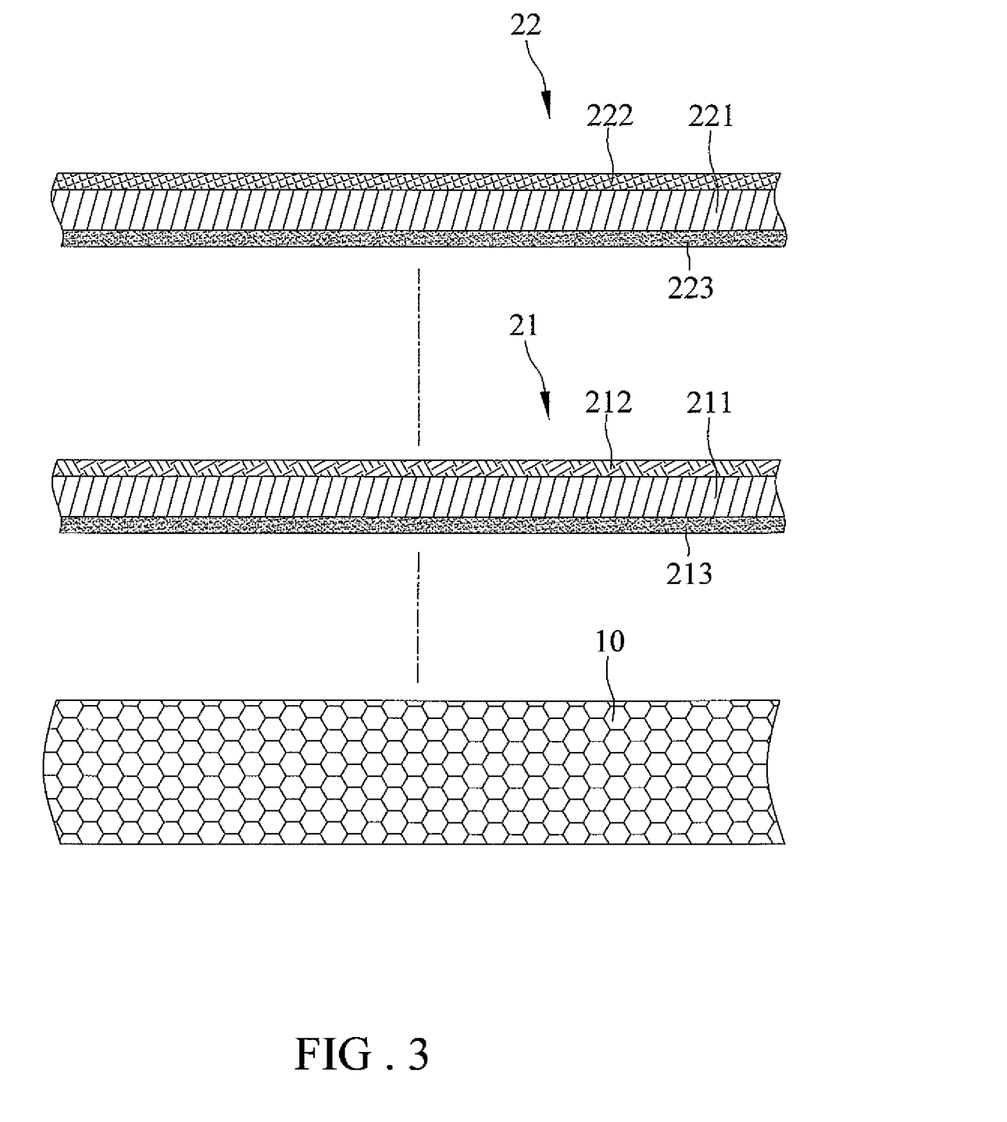
FIG. 3 is a cross-section view of FIG. 2 and shows a first plate arranged between a base and a second plate.

Step (a): providing a base 10, a first plate 21, and a second plate 22, which have been cut to a predetermined shape respectively by a cutting mold. The base 10 may be constructed of cloth or leather. The first plate 21 includes a first medium 211, a first decorative layer 212, and a first thermosol layer 213 therein. The first medium 211 is disposed between the first decorative layer 212 and the first thermosol layer 213. The first medium 211 may be constructed of thermoplastic polyurethane (TPU). The first decorative layer 212.may be constructed of polyurethane (PU) and has at least one color and design. While the first decorative layer 212 is heated, it still remains in the given design and maintains its original color. The first thermosol layer 213 may be constructed of thermoplastic polyurethane (TPU), ethylene vinyl acetate (EVA), total physical response (TPR), or polyamide. Further, the first thermosol layer 213 may have two opposite surfaces both made from temporary sticky material to temporarily stick with the first medium 211 and the base 10, respectively. Additionally, the first thermosol layer 213 may only have a single surface made from temporary sticky material to temporarily stick with the first medium 211.

The second plate 22 includes a second medium 221, a second decorative layer 222, and a second thermosol layer 223 therein. The second medium 221 is disposed between the second decorative layer 222 and the second thermosol layer 223. The second medium 221 may be constructed of thermoplastic polyurethane (TPU). The second decorative layer 222 may be constructed of polyurethane (PU) and has at least one color and design. While the second decorative layer 222 is heated, it still remains in the given design and maintains its original color. Further, the second thermosol layer 223 may have two opposite surfaces both made from temporary sticky material to temporarily stick with the second medium 221 and the first decorative layer 212, respectively. Additionally, the second thermosol layer 223 may only have a single surface made from temporary sticky material to temporarily stick with the second medium 221.

Step (b): arranging the base 10 and the first and second plates 21 and 22 in a predetermined order. The first and second plates 21 and 22 may be disposed onto the base 10. The first and second plates 21 and 22 can completely overlap each other, so that the first plate 21 is attached onto the base 10. Additionally, the first and second plates 21 and 22 can also partly overlap each other, so that the first plate 21 and a part of the second plate 22 that do not overlap with the first plate 21 are attached onto the base 10.

Figure 4:
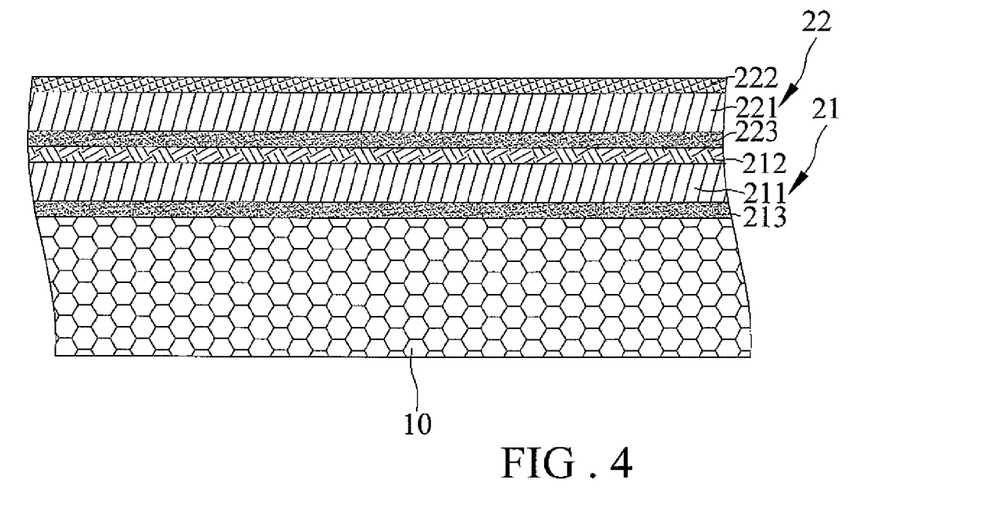
FIG. 4 is a cross-section view and shows the first plate stacked onto the base and the second layer stacked onto the first plate.

Step (c): stacking the first and second plates 21 and 22 and the base 10 and the first plate 21 disposed between the base 10 and the second plate 22 to form a stacked array. The first thermosol layer 213 is stuck onto the base 10 so that the first plate 21 is connected and temporarily stuck onto the base 10. The second thermosol layer 223 is stuck onto the first decorative layer 212 so that the second plate 22 is connected and temporarily stuck onto the first plate 21. Hence, the base 10 and the first and second plates 21 and 22 are formed in a stacked array and will not detach from each other.

Figure 5:
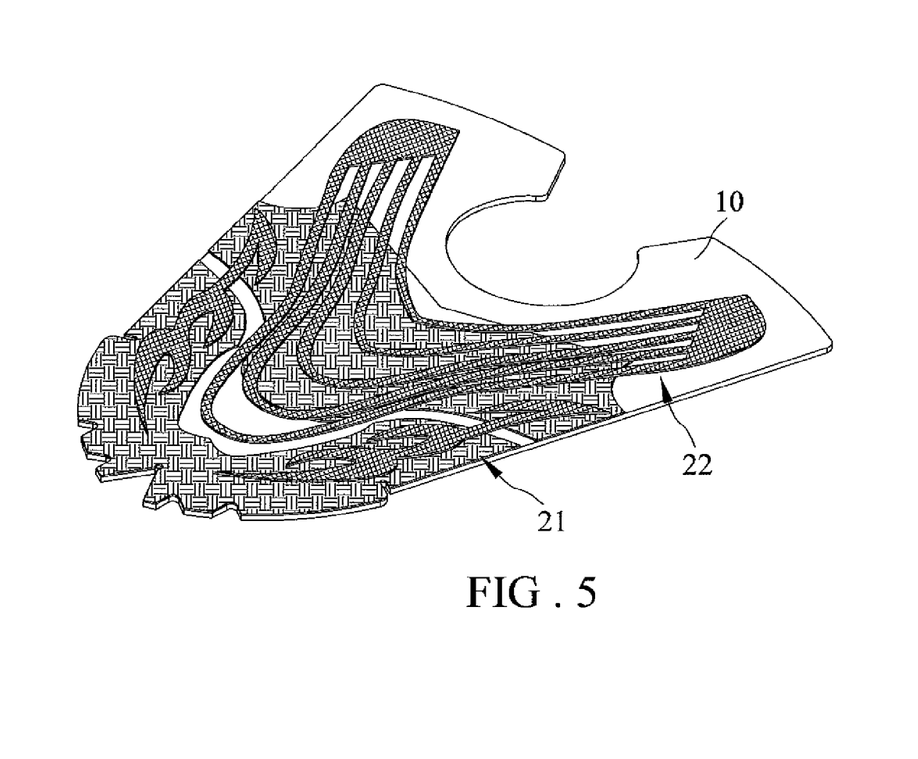
FIG. 5 is a perspective view of the multi-layer decorating vamp in accordance with the first embodiment.

Step (d): hot pressing the stacked array. The base 10 and the first and second plates 21 and 22 are received in a hot press machine. A user configures the hot pressing condition which includes hot pressing temperature, time and pressure. An adhesion force formed between the first and second plates 21 and 22 is influenced by the hot pressing condition. Further, the base 10 and the first and second plates 21 and 22 are pressed by the hot press machine according the hot pressing condition, so that the base 10 and the first and second plates 21 and 22 are stuck security each other to form the multi-layer decorative vamp.

Figure 6:
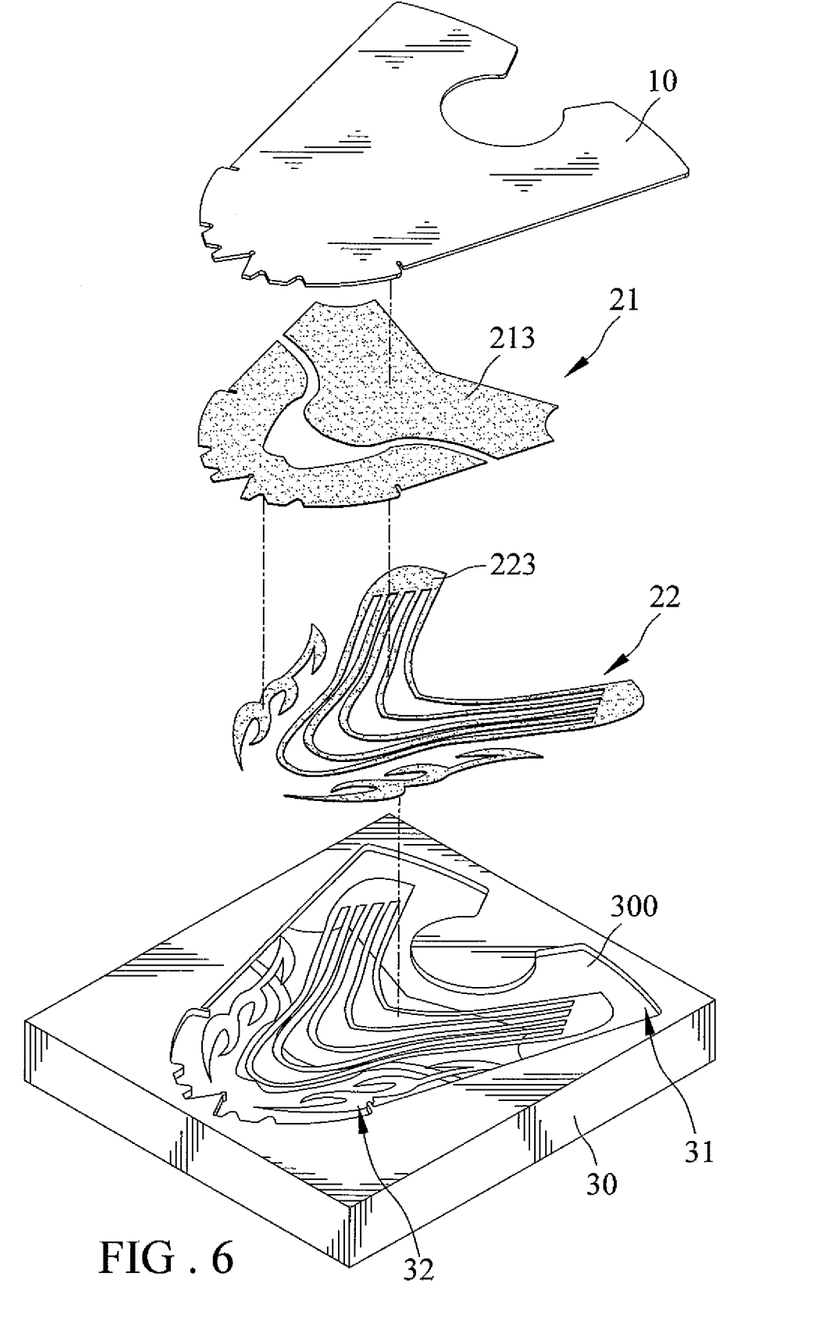
FIG. 6 is an exploded perspective view of the multi-layer decorating vamp according to a second embodiment of the present invention.
Figure 7:
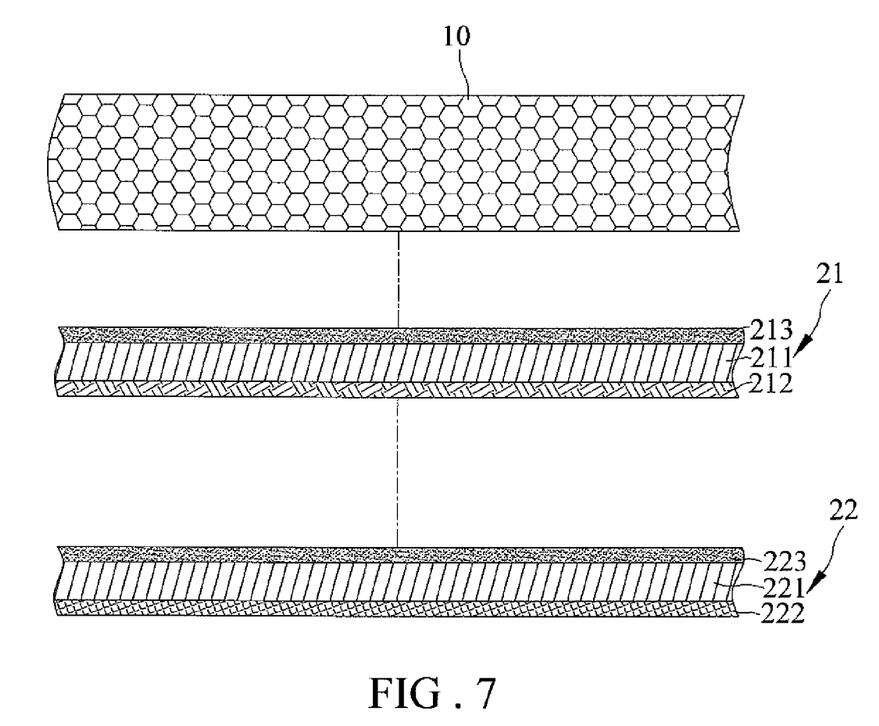
FIG. 7 is a cross-section view of FIG. 6 and shows the first plate arranged between the base and the second plate.
Figure 8:
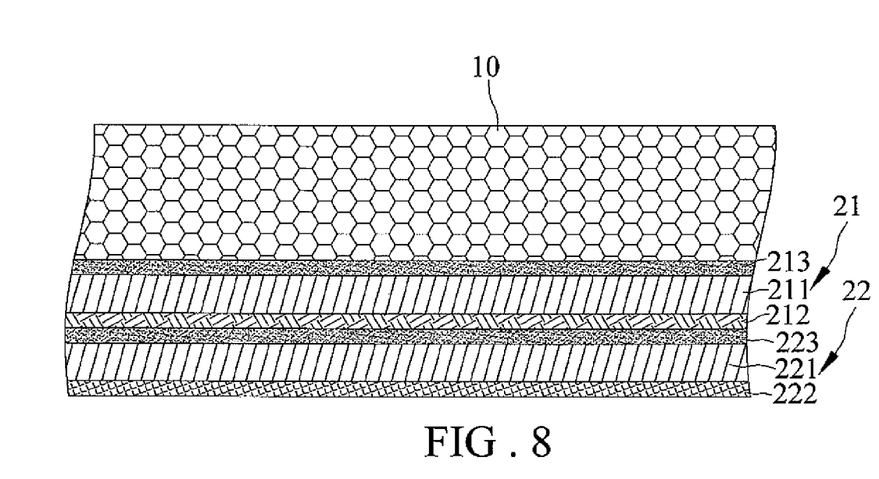
FIG. 8 is a cross-section view and shows the base stacked onto the first plate and the first plate stacked onto the second plate in accordance with the second embodiment.

Referring to FIGS. 6 through 8, there is shown a multi-layer decorative vamp according to a second embodiment of the present invention. The steps of the second embodiment are similar to the first embodiment substantially except that the second embodiment further includes a restricting mold 30.

Step (a): providing the base 10, the first plate 21, the second plate 22, and a restricting mold 30. The restricting mold 30 includes a cavity 300 having first and second recesses 31 and 32. A depth defined in the first recess 31 is less than a depth defined in the second recess 32. An outer periphery of the first recess 31 and an outer periphery of the base 10 are the same. An outer periphery of the second recess 32 and an outer periphery of the second plate 22 are the same. The first and second recesses 31 and 32 include at least one concave-convex texture formed on their bottom to align the base 10 and the first and second plates 21 and 22 easily.

Step (b) is the same as step (b) of the first embodiment.

Step (c): stacking the first and second plates 21 and 22 and the base 10, with the first plate 21 disposed between the base 10 and the second plate 22 to form a stacked array. The second plate 22 is received into the second recess 32. The first plate 21 is stacked onto the second plate 22 and received into the first recess 31. The first thermosol layer 213 is stuck onto the base 10, so that the first plate 21 is connected and temporarily stuck onto the base 10. The second thermosol layer 223 is stuck onto the first decorative layer 212, so that the second plate 22 is connected and temporarily stuck onto the first plate 21. Hence, the base 10 and the first and second plates 21 and 22 are formed a stacked array and will not detach from each other.

Step (d) is the same as step (d) of the first embodiment.

Referring to FIGS. 9 through 12, there is shown a multi-layer decorative vamp according to a third embodiment of the present invention. The steps of the third embodiment are similar to the first embodiment substantially except that the third embodiment further includes an adhesive film 40.

Figure 9:
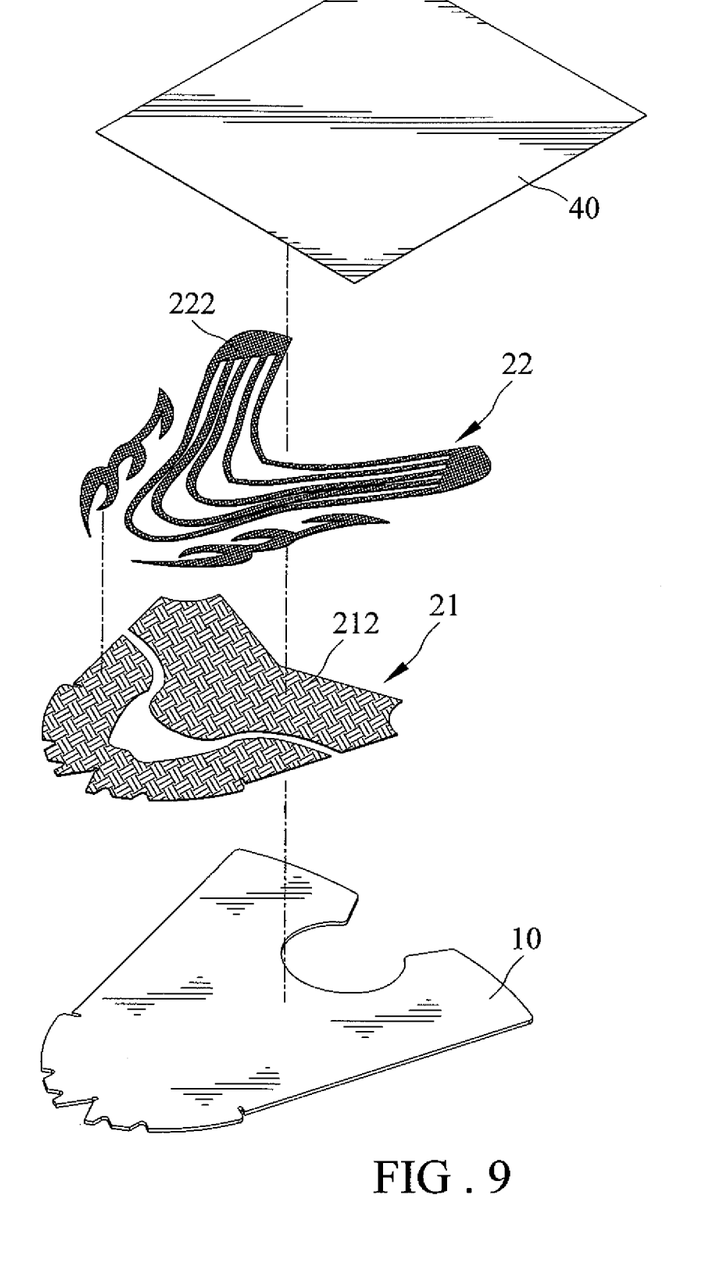
FIG. 9 is an exploded perspective view of the multi-layer decorating vamp according to a third embodiment of the present invention.
Figure 10:
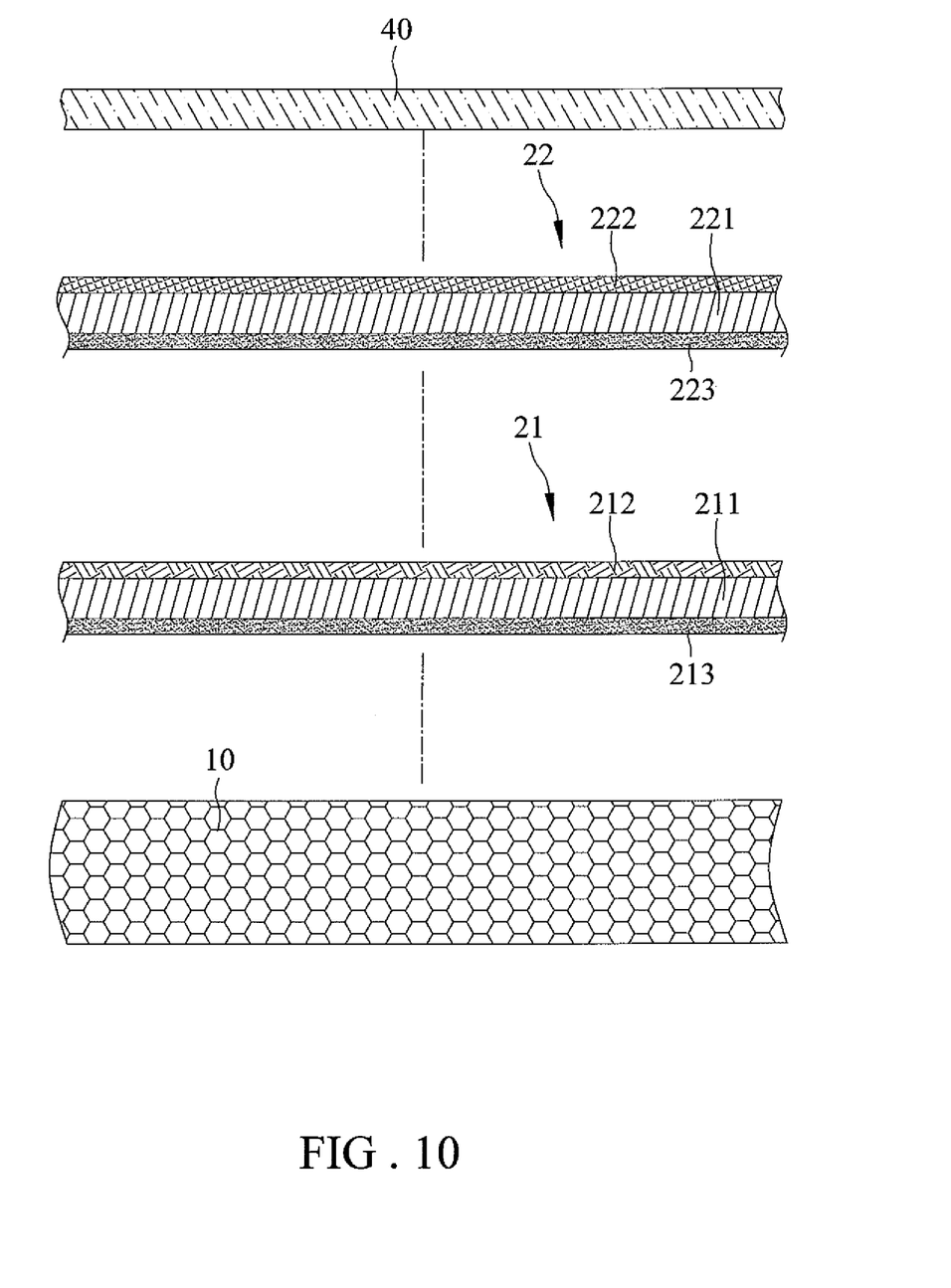
FIG. 10 is a cross-section view of FIG. 9 and shows the first and second plates arranged between the base and an adhesive film.

Step (a): providing the base 10, the first plate 21, the second plate 22, and an adhesive film 40. The adhesive film 40, the first thermosol layer 213, and the second thermosol layer 223 respectively has a single surface made from temporary sticky material. Furthermore, while the adhesive film 40 is hot pressed, it still maintains its sticky material property.

Step (b) is the same as step (b) of the first embodiment.

Figure 11:
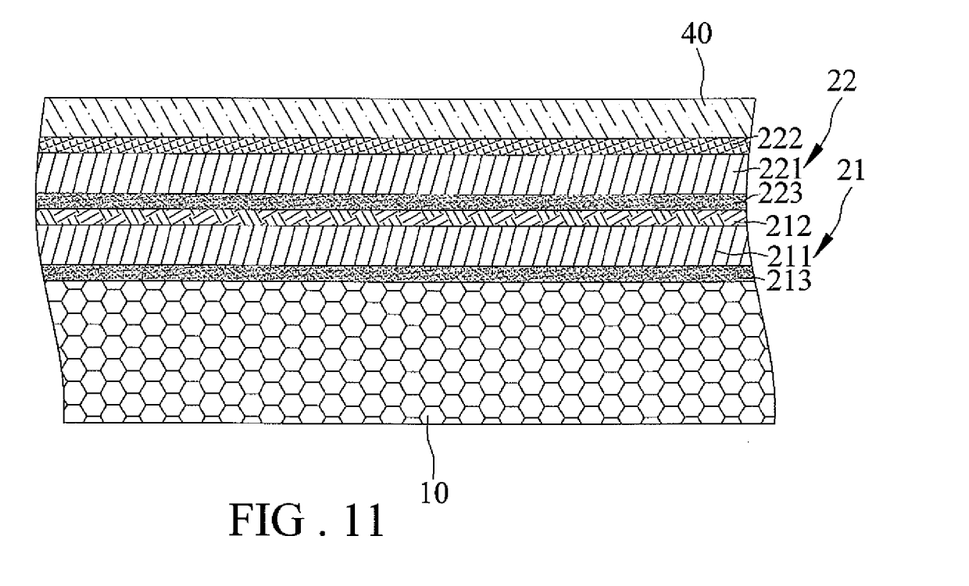
FIG. 11 is a cross-section view and shows the first plate stacked onto the base and the second plate stacked onto the first plate and the adhesive film stacked onto the second plate in accordance with the third embodiment.

Step (c): stacking the adhesive film 40, the first and second plates 21 and 22 and the base 10, with the first and second plates 21 and 22 disposed between the base 10 and the adhesive film 40 to form a stacked array. The adhesive film 40 and the base 10 are stuck to each other with a space formed therebetween. The first and second plates 21 and 22 are received in the space formed between the adhesive film 40 and the base 10. The first plate 21 is disposed between the base 10, and the second plate 22, and the second plate 22 is disposed between the first plate 21 and the adhesive film 40. The first thermosol layer 213 is stuck onto the base 10 so that the first plate 21 is connected and temporarily stuck onto the base 10. The second thermosol layer 223 is stuck onto the first decorative layer 212, so that the second plate 22 is connected and temporarily stuck onto the first plate 21.

Figure 12:
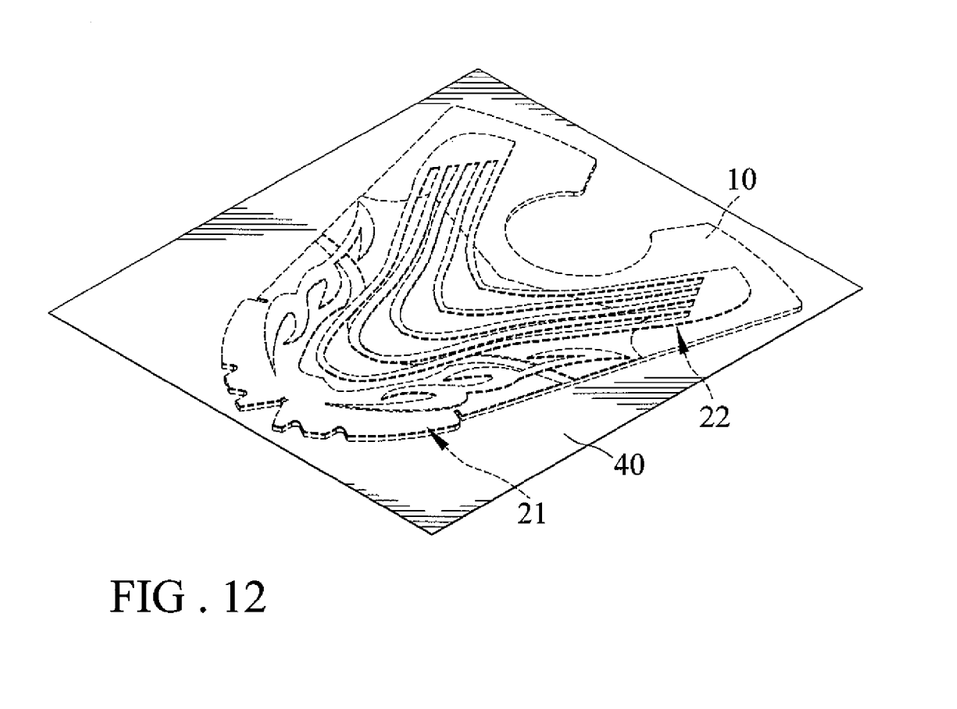
FIG. 12 shows a stacked array of FIG. 11 hot pressed.

Step (d) is similar to step (d) of the first embodiment except that after hot pressing, the adhesive film 40 must be detached from the base 10.

Figure 13:
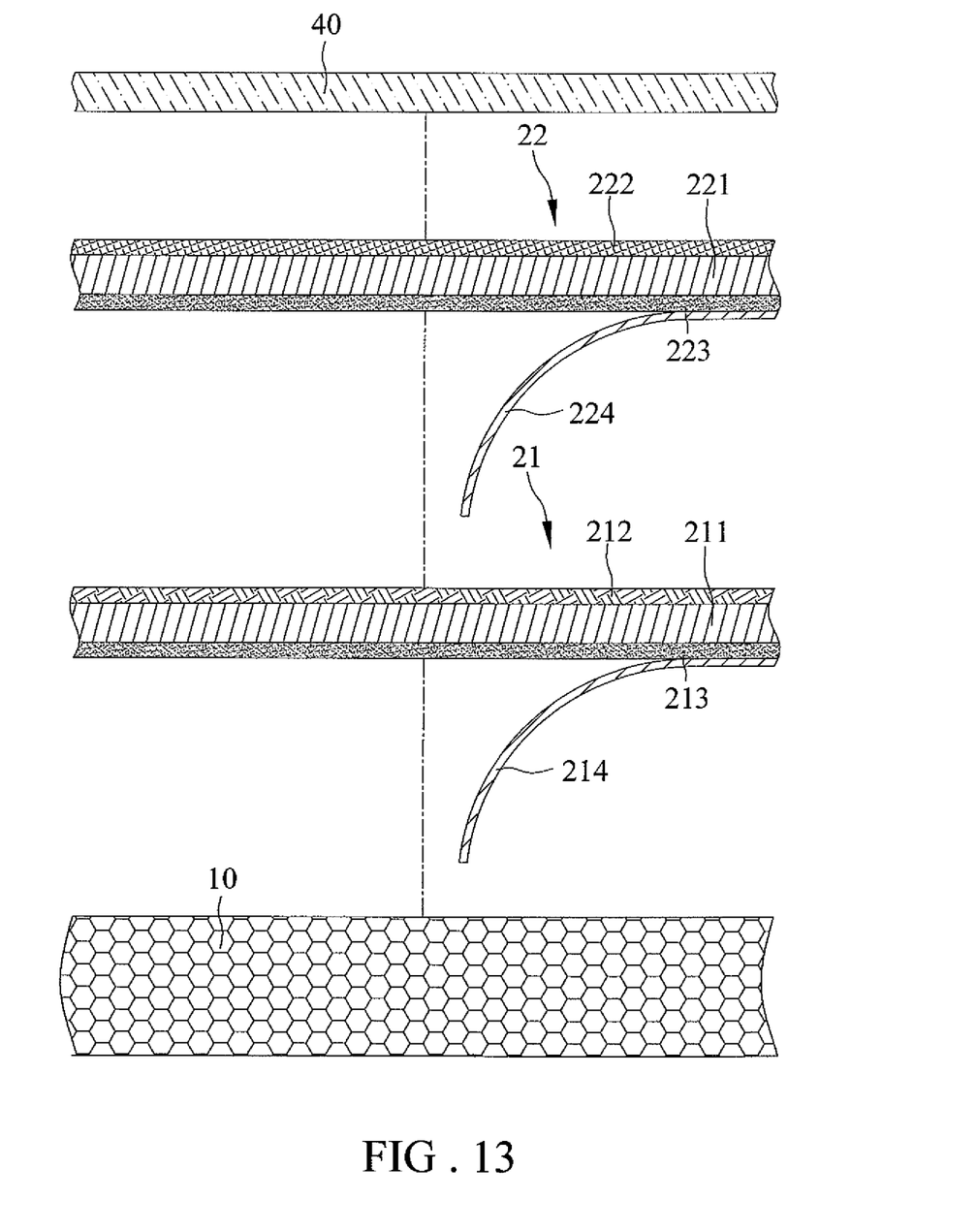
FIG. 13 is a cross-section view of the multi-layer decorating vamp according to a fourth embodiment of the present invention.

Referring to FIG. 13, there is shown a multi-layer decorative vamp according to a fourth embodiment of the present invention. The steps of the fourth embodiment are similar to the third embodiment substantially except that the fourth embodiment further includes first and second separating layers 214 and 224 respectively covering the first and second thermosol layers 213 and 223 to avoid the stickiness of the first and second thermosol layers 213 and 223 being reduced, when the first and second thermosol layers 213 and 223 are touched unnecessarily Step (a): providing the base 10, the first plate 21, and the second plate 22. The first plate 21 includes a first separating layer 214 removably attached to the first thermosol layer 213. The second plate 22 includes a second separating layer 224 removably attached to the second thermosol layer 223.

Step (b) is the same as step (b) of the third embodiment.

Step (c) is similar to step (c) of the third embodiment except that the first separating layer 214 is removed from the first thermosol layer 213. Then, the first thermosol layer 213 is stuck onto the base 10, the second separating layer 224 is removed from the second thermosol layer 223, and the second thermosol layer 223 is stuck onto the first plate 21.

Step (d) is the same as step (d) of the third embodiment.

Referring to FIGS. 14 through 17, there is shown a multi-layer decorative vamp according to a fifth embodiment of the present invention. The steps of the fifth embodiment are similar to the fourth embodiment substantially except that the fifth embodiment further includes the restricting mold 30.

Figure 14:
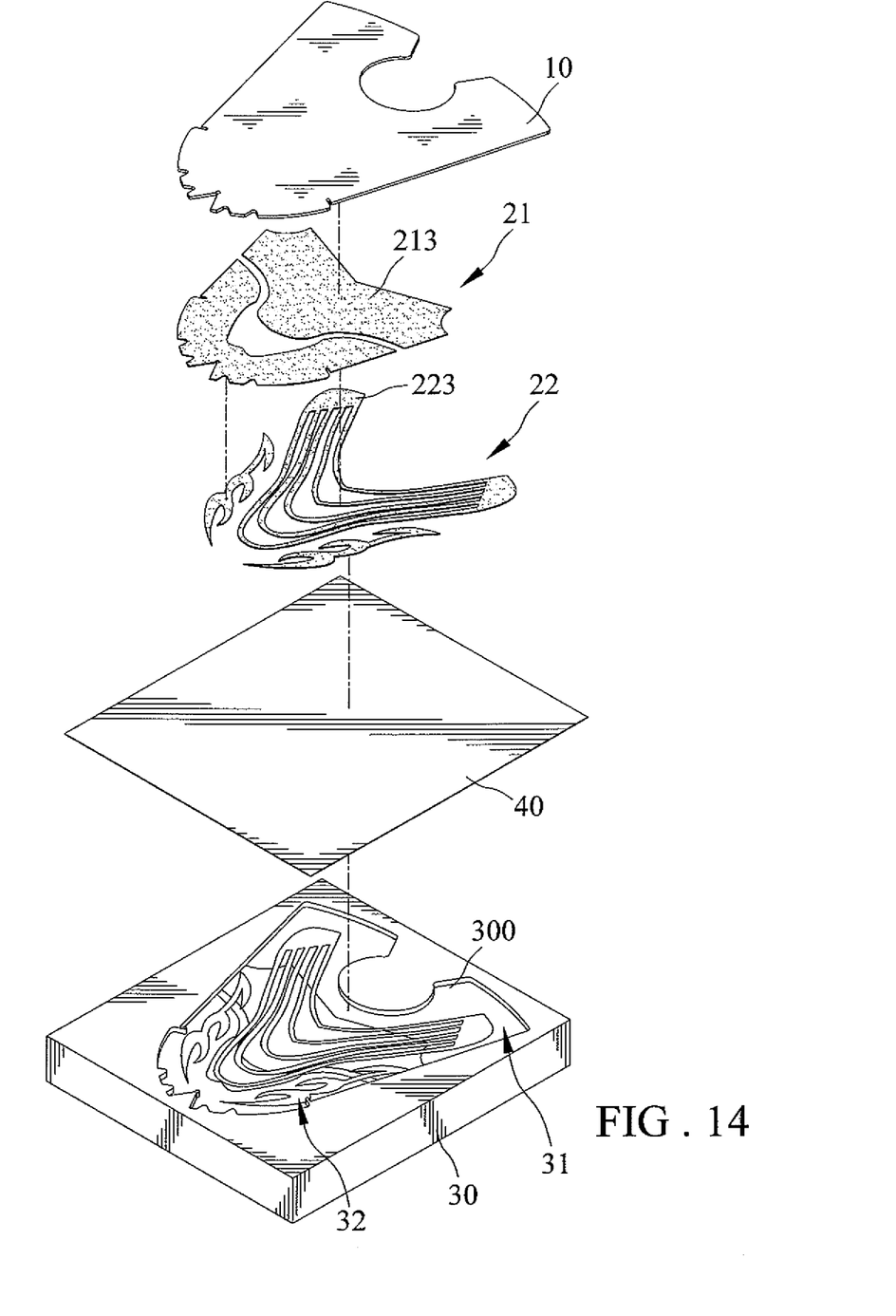
FIG. 14 is an exploded perspective view of the multi-layer decorating vamp according to the fifth embodiment of the present invention.
Figure 15:
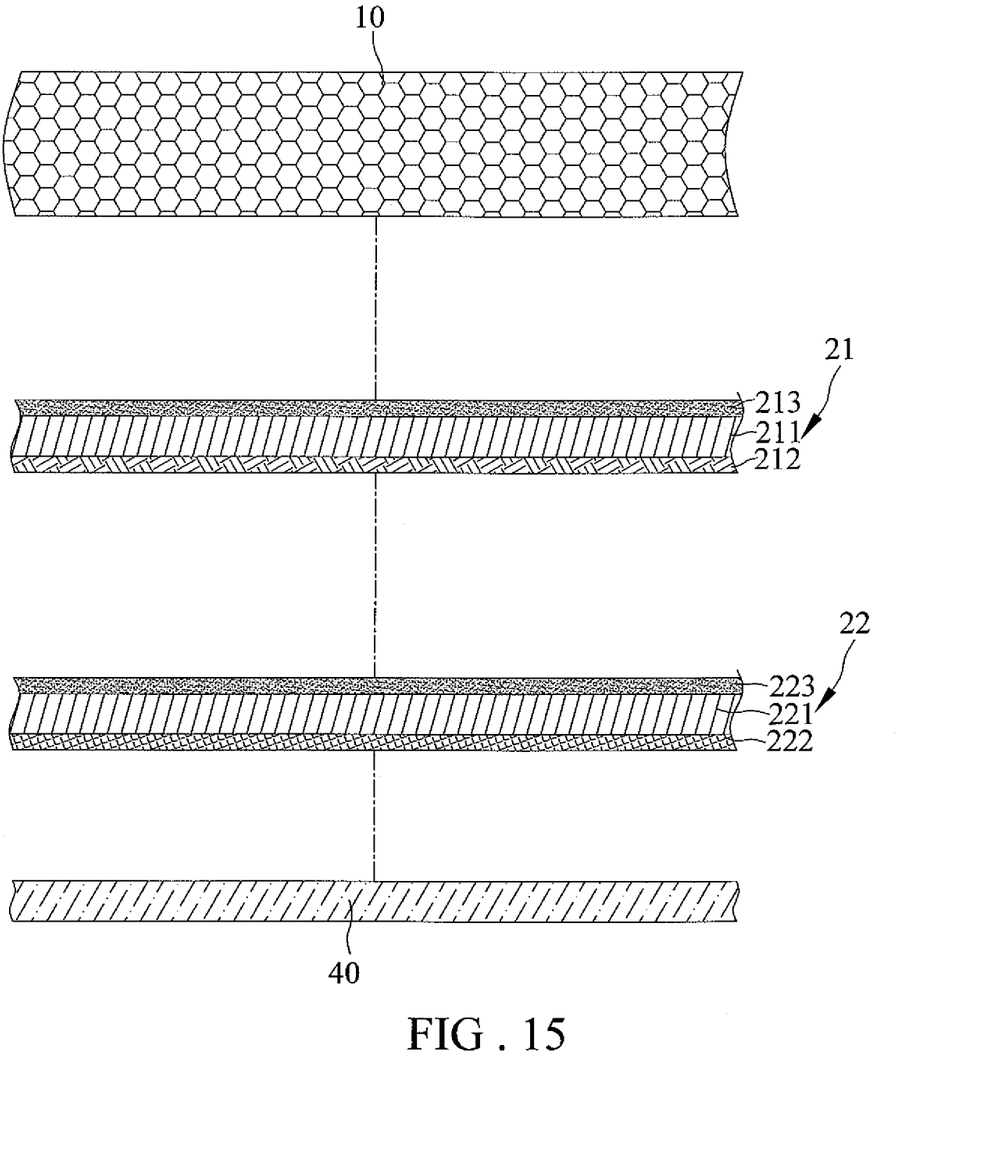
FIG. 15 is a cross-section view of FIG. 14 and shows the first and second plates arranged between the base and an adhesive film.

Step (a): providing the base 10, the first plate 21, the second plate 22, the restricting mold 30, and the adhesive film 40.

Figure 16:
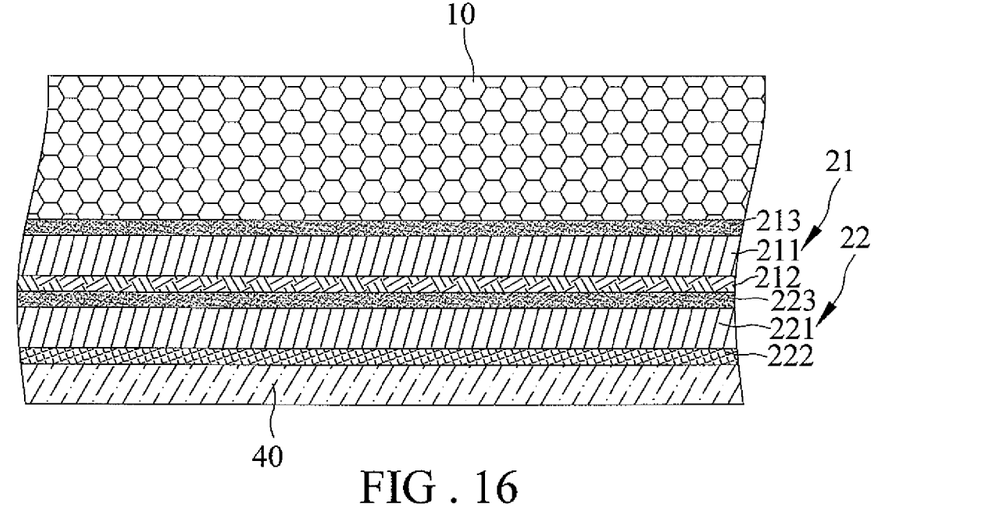
FIG. 16 is a cross-section view and shows the base stacked onto the first plate and the first plate stacked onto the second plate and the second plate stacked onto the adhesive film in accordance with the fifth embodiment.

Step (b) is similar to step (b) of the fourth embodiment except that the adhesive film 40 is received in the restricting mold 30. The adhesive film 40 and the base 10 are stuck to each other with a space formed therebetween. The first and second plates 21 and 22 are received in the space formed between the adhesive film 40 and the base 10. The second plate 22 is received into the second recess 32. The first plate 21 is received into the first recess 31.

Figure 17:
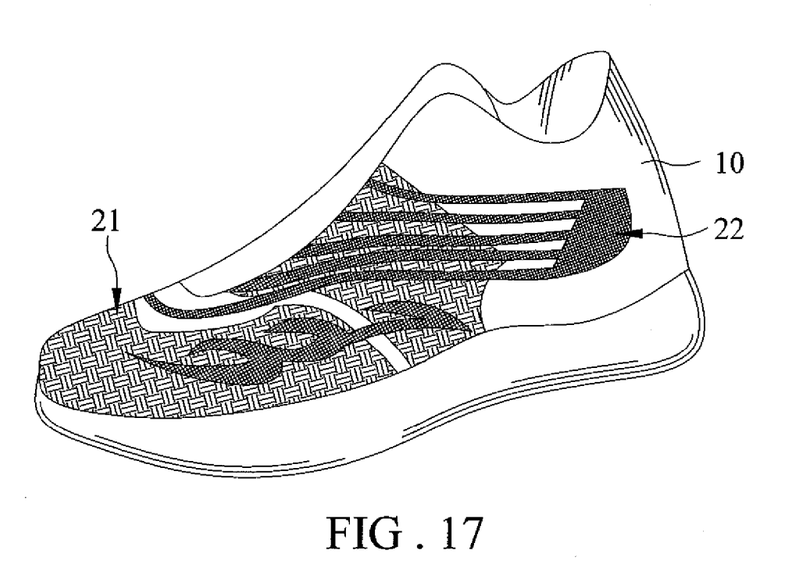
FIG. 17 shows a shoe with the multi-layer decorating vamp according to the present invention.

Step (c) and step (d) are the same as step (c) and step (d) of the fourth embodiment.

In view of the foregoing, an advantage of the method for producing the multi-layer decorating vamp according to the present invention is that the base 10 and the first and second plates 21 and 22 are connected with each other by hot pressing rather than sewing, thereby allowing the multilayer decorating vamp to be processed accurately, conveniently and in a cost-saving manner.

Another advantage of the method for producing the multi-layer decorating vamp according to the present invention is that the first and second plates 21 and 22 can be small objects and do not require the outlet seams.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method for producing a multi-layer decorating vamp includes:
   (a) providing a base, a first plate, and a second plate;
   (b) arranging the base and the first and second plates in a predetermined order, with the first and second plates disposed onto the base;
   (c) stacking the first and second plates and the base, with the first plate disposed between the base and the second plate to form a stacked array; and
   (d) hot pressing the stacked array.

2. The method for producing the multi-layer decorating vamp as claimed in claim 1, wherein each of the base, the first plate and the second plate is cut to a predetermined shape, respectively.

3. The method for producing the multi-layer decorating vamp as claimed in claim 1, wherein the first plate includes a first medium, a first decorative layer, and a first thermosol layer therein, with the first medium disposed between the first decorative layer and the first thermosol layer stuck onto the base;
   wherein the second plate includes a second medium, a second decorative layer, and a second thermosol layer therein, with the second medium disposed between the second decorative layer and the second thermosol layer stuck onto the first decorative layer.

4. The method for producing the multi-layer decorating vamp as claimed in claim 3, wherein the first medium is constructed of thermoplastic polyurethane (TPU), wherein the first decorative layer is constructed of polyurethane (PU), with the first decorative layer having at least one color and design, wherein while the first decorative layer is heated, the first decorative layer remains in the design and maintains the original color;
   wherein the second medium is constructed of thermoplastic polyurethane (TPU), wherein the second decorative layer is constructed of polyurethane (PU), with the second decorative layer having at least one color and design, wherein while the second decorative layer is heated, the second decorative layer remains in the design and maintains the original color of the second decorative layer.

5. The method for producing the multi-layer decorating vamp as claimed in claim 3, wherein the first thermosol layer has two opposite surfaces both made from temporary sticky material to temporarily stick with the first medium and the base, respectively; and
   wherein the second thermosol layer has two opposite surfaces both made from temporary sticky material to temporarily stick with the second medium and the first decorative layer, respectively.

6. The method for producing the multi-layer decorating vamp as claimed in claim 3, wherein the first thermosol layer has a single surface made from temporary sticky material to temporarily stick with the first medium; and
   wherein the second thermosol layer has a single surface made from temporary sticky material to temporarily stick with the second medium.

7. The method for producing the multi-layer decorating vamp
   as claimed in claim 3, wherein the first plate includes a first separating layer removably attached to the first thermosol layer, and wherein the second plate includes a second separating layer removably attached to the second thermosol layer.

8. The method for producing the multi-layer decorating vamp as claimed in claim 1, wherein providing the base, the first plate and the second plate comprises further providing a restricting mold, wherein the restricting mold includes a cavity having first and second recesses, wherein a depth defined in the first recess is less than a depth defined in the second recess, wherein an outer periphery of the first recess and an outer periphery of the base are the same, and wherein an outer periphery of the second recess and an outer periphery of the second plate are the same; and     wherein the first plate is stacked onto the second plate and received into the first recess, and wherein the second plate is received into the second recess.

9. The method for producing the multi-layer decorating vamp as claimed in claim 1, wherein providing the base, the first plate and the second plate comprises further providing an adhesive film, wherein the adhesive film has a single surface made from temporary sticky material, wherein the adhesive film and the base are stuck with each other with a space formed therebetween, with the first and second plates received in the space formed between the adhesive film and the base; and     wherein after hot pressing, detaching the adhesive film from the base.

\* \* \* \* \*